(12) United States Patent
Shifren et al.

(10) Patent No.: US 9,747,982 B1
(45) Date of Patent: Aug. 29, 2017

(54) DEVICE AND METHOD FOR GENERATING RANDOM NUMBERS

(71) Applicant: ARM Ltd., Cambridge (GB)

(72) Inventors: Lucian Shifren, San Jose, CA (US); Robert Campbell Aitken, San Jose, CA (US)

(73) Assignee: ARM Ltd., Cambridge (GB)

( * ) Notice: Subject to any disclaimer, the term of this patent is extended or adjusted under 35 U.S.C. 154(b) by 0 days.

(21) Appl. No.: 15/050,324

(22) Filed: Feb. 22, 2016

(51) Int. Cl.
G11C 11/00 (2006.01)
G11C 13/00 (2006.01)
G06F 7/58 (2006.01)

(52) U.S. Cl.
CPC ............ *G11C 13/0069* (2013.01); *G06F 7/58* (2013.01); *G11C 13/0004* (2013.01)

(58) Field of Classification Search
CPC .... G11C 13/0069; G11C 13/0004; G06F 7/58
USPC .......................................... 365/148, 185.18
See application file for complete search history.

(56) References Cited

U.S. PATENT DOCUMENTS

| | | | |
|---|---|---|---|
| 7,298,640 B2 | 11/2007 | Chen et al. | |
| 7,639,523 B2 | 12/2009 | Celinska et al. | |
| 7,778,063 B2 | 8/2010 | Brubaker et al. | |
| 7,872,900 B2 | 1/2011 | Paz de Araujo et al. | |
| 9,075,675 B2 * | 7/2015 | Liu | G06F 7/588 708/250 |
| 9,304,741 B2 * | 4/2016 | Massetti | G01R 29/26 |
| 2008/0107801 A1 | 5/2008 | Celinska et al. | |
| 2010/0217921 A1 * | 8/2010 | Mun | G06F 11/1072 711/103 |
| 2011/0022648 A1 * | 1/2011 | Harris | G06F 7/588 708/254 |
| 2013/0173989 A1 * | 7/2013 | Chung | G11C 7/1006 714/763 |
| 2013/0285699 A1 | 10/2013 | McWilliams et al. | |
| 2014/0037086 A1 | 2/2014 | Seol | |
| 2014/0037093 A1 * | 2/2014 | Park | H04L 9/0894 380/277 |
| 2014/0146607 A1 * | 5/2014 | Nagai | G06F 7/58 365/185.04 |
| 2014/0268994 A1 * | 9/2014 | Rose | G11C 13/0059 365/148 |
| 2014/0301127 A1 * | 10/2014 | Kim | G11C 13/0004 365/148 |
| 2014/0313835 A1 * | 10/2014 | Lee | G11C 16/10 365/185.18 |
| 2015/0213885 A1 * | 7/2015 | Katoh | G11C 13/0007 365/148 |

(Continued)

FOREIGN PATENT DOCUMENTS

EP 2933720 A1 10/2015

OTHER PUBLICATIONS

PCT/GB2017/050337: ISR and Written Opinion, dated May 8, 2017, 14 pages.

*Primary Examiner* — Viet Q Nguyen
(74) *Attorney, Agent, or Firm* — Berkeley Law & Technology Group, LLP

(57) ABSTRACT

According to an embodiment of the present disclosure, a device and a method are provided. The device includes one or more resistive random access memory (ReRAM) elements. The device further includes a random number generator configured to generate a random number in dependence on impedance values of the one or more ReRAM elements.

14 Claims, 2 Drawing Sheets

(56) References Cited

U.S. PATENT DOCUMENTS

2015/0301802 A1* 10/2015 Katoh ................... G06F 5/01
                                                    708/190
2015/0340092 A1   11/2015 Ogasahara
2016/0028544 A1    1/2016 Hyde

* cited by examiner

US 9,747,982 B1

DEVICE AND METHOD FOR GENERATING RANDOM NUMBERS

FIELD OF THE INVENTION

The present disclosure relates to random number generators.

BACKGROUND

A random number generator may be understood as a device for generating numbers in a random manner. Random number generators are used in a variety of technical fields. For instance, a random number generator may be implemented in a gaming industry to generate random numbers. In another example, a random number generator may be used in an encryption system to generate random numbers which may then be used as seeds for an encryption algorithm. Such random number generators are typically algorithm-based and are thus, susceptible to attack by malicious third parties. As a result, the security of systems implementing such random number generators is at risk.

SUMMARY

According to a first aspect of the present techniques, a device is provided. The device includes one or more resistive random access memory (ReRAM) elements. The device further includes a random number generator configured to generate a random number dependent on an impedance value of the or each ReRAM element.

According to a second aspect of the present techniques, a method for generating random numbers is provided. The method includes applying a programming signal to one or more resistive random access memory (ReRAM) elements. The method further includes determining an impedance value of the or each ReRAM element and generating a random number based on the determined impedance values of the one or more ReRAM elements.

The following features apply equally to both aspects.

The random number generator may be further configured to determine the impedance values at one or more output nodes, each output node being coupled to at least one ReRAM element of the one or more ReRAM elements, wherein an impedance value at each output node depends upon impedance values of the respective at least one ReRAM element.

In embodiments, the random number generator may be configured to measure at least one of a current signal, a voltage signal or a time delay at the one or more output nodes to determine the impedance values at the one or more output nodes.

In embodiments, the device may further comprise a control circuit configured to provide a programming signal to at least one ReRAM element of the one or more ReRAM elements to configure an impedance state of the at least one ReRAM element. The programming signal may be a voltage signal. In embodiments, the control circuit may be further configured to vary at least one of an amplitude and a pulse width of the programming signal.

The or each ReRAM element may comprise one of: a transition metal oxide, a chalcogenide, a perovskite, one or more nanotubes, an amorphous oxide, an amorphous semiconductor, and a polycrystalline semiconductor.

The ReRAM element, or at least one of the ReRAM elements, may be any one of the following: a phase change ReRAM, a conductive bridge ReRAM, a transition metal oxide based ReRAM, and a nanotube based ReRAM.

In embodiments, the one or more ReRAM elements may be arranged in a matrix configuration. Additionally or alternatively, the one or more ReRAM elements may be arranged in a crosspoint structure configuration. Additionally or alternatively, the one or more ReRAM elements may be arranged in an n-dimensional array.

The step of applying the programming signal may comprise varying at least one of an amplitude and a pulse width of the programming signal.

The step of determining the impedance value may comprise measuring at least one of a current signal, a voltage signal or a time delay at one or more output nodes, wherein each output node is coupled to at least one ReRAM element.

BRIEF DESCRIPTION OF THE DRAWINGS

The techniques are diagrammatically illustrated, by way of example, in the accompanying drawings, in which.

It is to be noted that like reference numerals designate identical or corresponding components throughout the drawings.

DETAILED DESCRIPTION

Broadly speaking, the present techniques relate to devices and methods for generating random numbers. According to an embodiment, a device for generating random numbers comprises one or more resistive random access memory (ReRAM) elements. The one or more ReRAM elements may include any type of ReRAM elements exhibiting stochastic switching behavior. For example, when a programming signal is applied to one of the ReRAM elements to program the ReRAM element to one of a plurality of impedance states, a corresponding impedance value of the ReRAM element is determined according to a stochastic process. The present disclosure exploits this stochastic behavior of ReRAM to generate a random number. The random number is generated using the random (stochastically determined) impedance values of the one or more ReRAM elements. As the present techniques exploit the stochastic nature of the physical characteristics of the ReRAM element(s) to generate a random number, prediction of such a random number is highly unlikely. Consequently, overall security and integrity of the random number generator is greatly enhanced.

Figure 1:
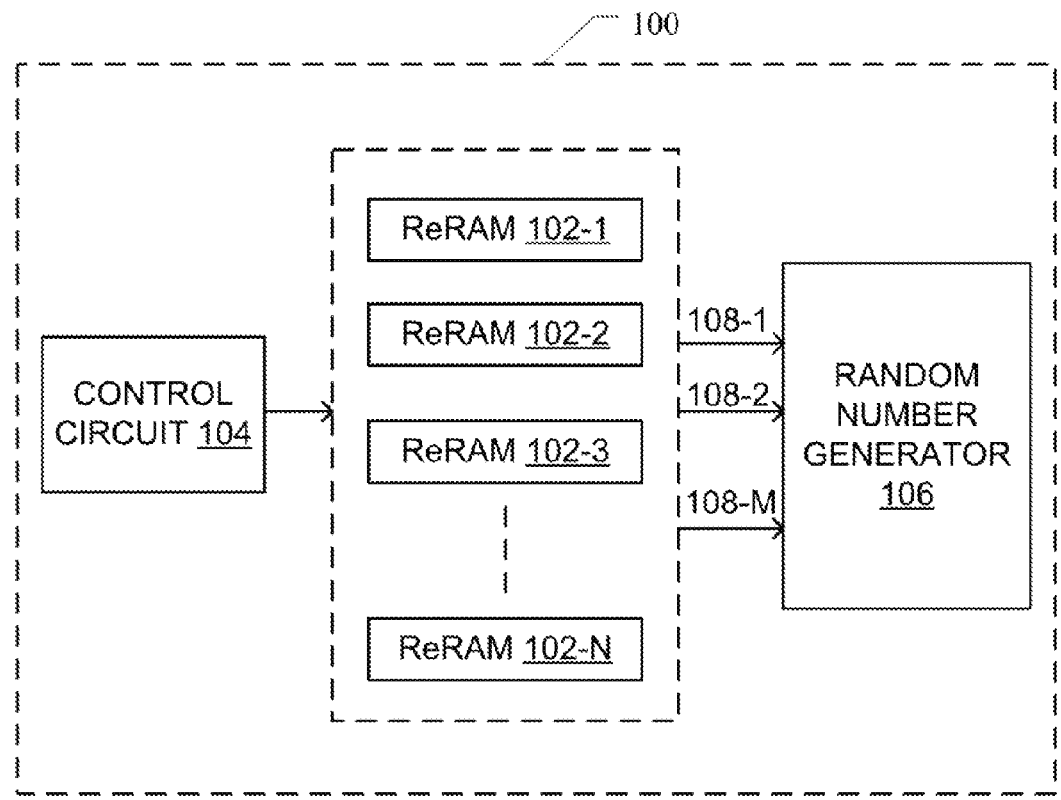
FIG. 1 illustrates an exemplary device for generating random numbers, in accordance with an embodiment.

Referring now to the drawings, FIG. 1 illustrates an exemplary device 100 for generating random numbers. The device 100 may be implemented in various fields, for example, in user authentication, cryptographic systems, gaming systems, and the like.

In an embodiment, the device 100 comprises one or more ReRAM elements 102-1, 102-2, 102-3, ..., 102-N, collectively referred to as ReRAM elements 102, a control circuit 104, and a random number generator 106. The device 100 may be used to generate an M-bit random number, where M is an integer. Further, M is greater than or equal to one, and is less than or equal to N (the number of ReRAM elements). The ReRAM elements 102 may be arranged to provide one or more output nodes 108-1, 108-2, ..., 108-P. In an embodiment, the number of output nodes (P) is equal to M. In another embodiment, P is less than M. The ReRAM elements 102 may be arranged in various configurations such as a matrix, a cross-point structure, an n-dimensional array or any other desired configuration. Each ReRAM element 102-*n* may be directly or indirectly coupled to one or more of the one or more output nodes 108. The ReRAM elements 102 may include any one of: a transition metal oxide, a chalcogenide, a perovskite, one or more nanotubes, an amorphous oxide, an amorphous semiconductor, and a polycrystalline semiconductor. The ReRAM elements 102 provided within device 100 may be of the same type or may be of different types. The types of ReRAM elements may include, without limitation, a phase change ReRAM, a conductive bridge ReRAM, a transition metal oxide based ReRAM, a nanotube-based ReRAM, or any type of ReRAM elements exhibiting stochastic switching behavior as described herein.

The control circuit 104 is configured to apply a programming signal to at least one ReRAM element 102-*n* of the ReRAM elements 102 to program the at least one ReRAM element 102-*n* to one impedance state of a plurality of impedance states. In an embodiment, the plurality of impedance states includes a high impedance state and a low impedance state. Further, the impedance state may be a resistive state. Where the device 100 comprises at least two ReRAM elements 102, the control circuit 104 may be configured to program each ReRAM element 102-*n* to the same impedance state or to different impedance states, as desired. Further, during every operation, the control circuit 104 may be configured to program the or each ReRAM element 102-*n* to the same impedance state or to different impedance states as desired. The programming signal may be set depending upon the type of the or each ReRAM element 102-*n*.

Depending upon the programming signal, the at least one ReRAM element 102-*n* switches to a corresponding impedance state. As the at least one ReRAM element 102-*n* exhibits a stochastic switching behavior, the at least one ReRAM element 102-*n* attains a random impedance value. As the impedance value at the one or more output nodes 108 depends upon impedance values of ReRAM elements connected (directly or indirectly) to a respective one of one or more output nodes 108, the impedance value at the one or more output node 108 is also random. The random number generator 106 is configured to measure the impedance values at the one or more output nodes 108. In an embodiment, the random number generator 106 measures the impedance values at the one or more output nodes 108 by applying a known current signal to the one or more output nodes 108 and measuring a resulting voltage at the one or more output nodes 108. Additionally or alternatively, the random number generator 106 measures the impedance values at the one or more output nodes 108 by applying a known voltage signal at the one or more output nodes 108 and measuring a resulting current at the one or more output nodes 108. In an embodiment, the random number generator 106 measures the impedance values at the one or more output nodes 108 by measuring impedance-dependent time delay values at the one or more output nodes 108 using, for example, an RC circuit. Other known techniques for measuring impedance values may also be used. Further, the random number generator 106 is configured to generate a random number based upon the measured impedances at the one or more output nodes 108 using conventional techniques known in the art. The random number thus generated may be used as a seed to generate a further random number, thereby enhancing the randomness of an overall system. As the resulting impedance values at the one or more output nodes 108 are random, a unique random number may be generated each time.

Each time a random number needs to be generated, the control circuit 104 applies the desired programming signal to the one or more ReRAM elements 102. Depending upon the programming signal, each ReRAM element 102-*n* attains an impedance value randomly. Consequently, the measured impedance values at the one or more output nodes 108 are different each time. As a result, a unique random number is generated by the random number generator 106.

In an embodiment, a degree of randomness of the impedance values of the ReRAM elements 102 depends upon either the amplitude, the pulse width, or both the amplitude and pulse width, of the programming signal. Therefore, according to an embodiment, the control circuit 104 may be configured to vary at least one of the amplitude and the pulse width of the programming signal to alter the degree of randomness of the impedance values of the ReRAM element(s).

In an embodiment, each ReRAM element may be used individually to generate one random bit. In an embodiment, each ReRAM element may be used individually to generate more than one random bit. In an embodiment, more than one ReRAM element may be used to generate one random bit, since a combination of more than one ReRAM elements exhibits more randomness than that exhibited by a single ReRAM element, thereby enhancing the overall performance of the device 100. In an embodiment, two or more ReRAM elements are used to generate more than one random bit.

Methods for generating random numbers are now described in detail with reference to the FIG. 2. As such, the depicted order and labeled steps are indicative of one embodiment of the presented method. Other steps and methods may be conceived that are equivalent in function, logic, or effect of one or more steps or portions thereof, of the illustrated method. Additionally, the format and symbols employed are provided to explain the logical steps of the method and are understood not to limit the scope of the method.

Figure 2:
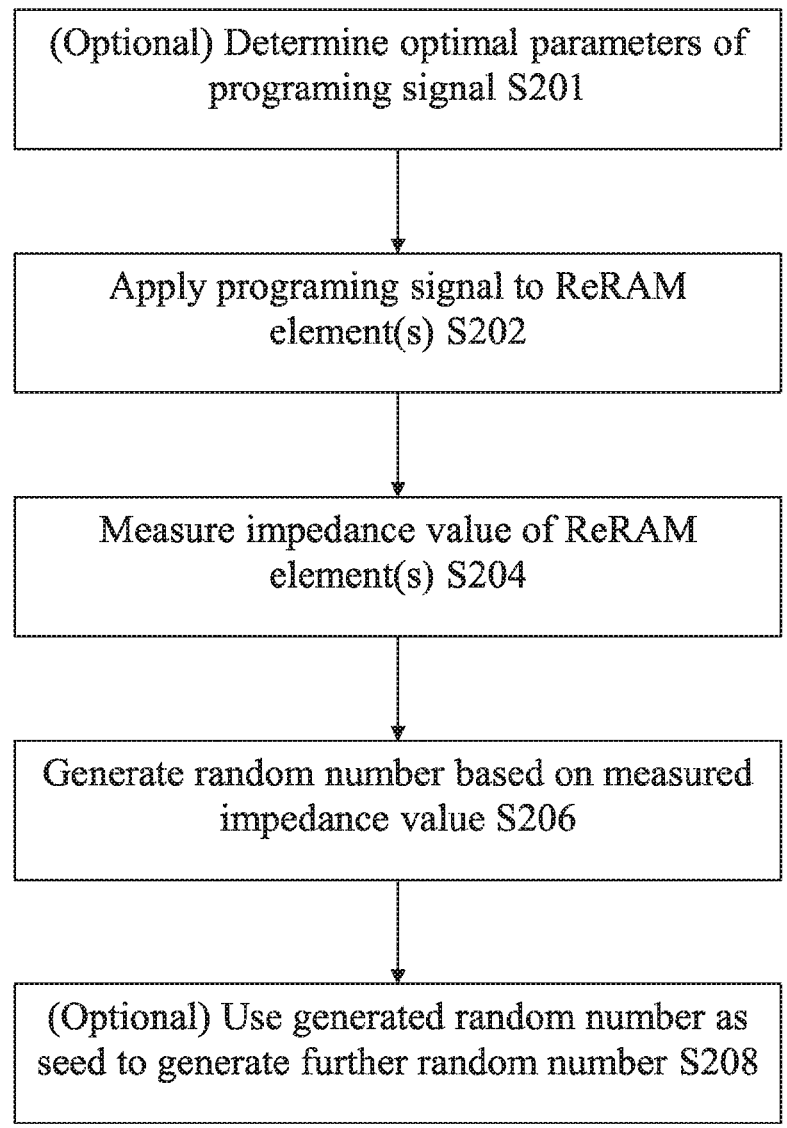
FIG. 2 illustrates an exemplary method for generating random numbers, in accordance with an embodiment.

Referring to the FIG. 2, an exemplary method 200 for generating random numbers is illustrated. At step S202, a programming signal is applied to the or each ReRAM element of device 100. The one or more ReRAM elements are capable of being configured into one of a plurality of impedance states, based on the applied programming signal. In an embodiment, the plurality of impedance states includes a high impedance state and a low impedance state. Further, the one or more ReRAM elements exhibit stochastic switching behavior. That is, an impedance value of each ReRAM element of the one or more ReRAM elements in a given impedance state is random.

In an embodiment, the ReRAM elements may be arranged in a defined configuration. For example, the ReRAM elements may be arranged in a matrix. In another example, the ReRAM elements may be arranged in a cross-point structure. In yet another example, the ReRAM elements may be arranged in an n-dimensional array.

At step S204, the impedance value of the or each ReRAM element is measured (or otherwise determined) by a random number generator 106. At step S206, a random number is generated based on the measured impedance value of the one or more ReRAM elements. In an embodiment, impedance values at one or more output nodes may be determined and the random number may be generated based upon the impedance values at the one or more output nodes. The impedance values at the one or more output nodes depend upon the impedance values of the one or more ReRAM elements and the configuration of the one or more ReRAM elements. In an embodiment, the impedance values at the one or more output nodes may be determined by applying a known current signal to the one or more output nodes and measuring resulting voltages at the one or more output nodes. In an embodiment, the impedance values at the one or more output nodes may be determined by applying a known voltage signal to the one or more output nodes and measuring resulting currents at the one or more output nodes. In an embodiment, the impedance values at the one or more output nodes may be determined by measuring impedance-dependent time delay values (for example, using an RC circuit) at the one or more output nodes. Other known techniques for determining impedance values may also be used.

Optionally, the generated random number may be used as a seed to generate further random numbers (step S208). This may enhance the randomness of the overall random number generation process.

Optionally, in embodiments, a learning phase may be employed in the process to generate a random number. In the learning phase, optimal parameters of the programming signal (pulse width and/or amplitude) to achieve a desired randomness may be determined using conventional testing methods (step S201). Further, entropy may be measured during the learning phase. The learning phase may be employed after manufacturing of a wafer for simplicity. To take into account chip-to-chip variation, the learning phase may be employed at chip power up. Further, to compensate for temperature and voltage conditions, the learning phase may be employed before generating a set of random numbers. A single learning phase may be employed at any of the stages discussed herein or multiple learning phases may be employed at different stages.

Thus, the present subject matter enhances security of systems implementing random number generation. As the present techniques exploit the stochastic nature of physical characteristics of the one or more ReRAM elements to generate a random number, prediction of such a random number is highly unlikely. Consequently, overall security and integrity of the random number generating device/system is improved. Further, the ReRAM elements exhibit the stochastic behavior at lower voltages, overall power consumption of a random number generating device can also be reduced The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The claims are as follows:

1. A device comprising:
   one or more resistive random access memory (Re RAM) elements;
   a random number generator configured to generate a random number dependent on an impedance value of at least one ReRAM element of the one or more ReRAM elements; and
   a control circuit configured to provide a programming signal to the at least one ReRAM element of the one or more ReRAM elements to configure an impedance value of the at least one ReRAM element of the one or more ReRAM elements, wherein the control circuit is further configured to vary at least an amplitude of the programming signal or a pulse width of the programming signal, or a combination thereof, to alter a degree of randomness of impedance values of the one or more ReRAM elements.

2. The device of claim 1, wherein the random number generator is further configured to determine the impedance values of the one or more eReRAM elements at one or more output nodes, each output node being coupled to at least one ReRAM element of the one or more ReRAM elements, wherein an impedance value at each output node depends, at least in part, upon impedance values of the respective at least one ReRAM element.

3. The device of claim 2, wherein the random number generator is configured to measure a current signal, a voltage signal or a time delay, or a combination thereof, at the one or more output nodes to determine the impedance values of the one or more ReRAM elements at the one or more output nodes.

4. The device of claim 1, wherein the programming signal comprises a voltage signal.

5. The device of claim 1, wherein the at least one of the one or more ReRAM elements comprises a transition metal oxide, a chalcogenide, a perovskite, one or more nanotubes, an amorphous oxide, an amorphous semiconductor or a polycrystalline semiconductor, or a combination thereof.

6. The device of claim 1, wherein the at least one of the one or more ReRAM elements comprises a phase change Re RAM.

7. The device of claim 1, wherein the at least one of the one or more ReRAM elements comprises a conductive bridge Re RAM.

8. The device of claim 1, wherein the at least one of the one or more ReRAM elements comprises a transition metal oxide based Re RAM.

9. The device of claim 1, wherein the at least one of the one or more ReRAM elements comprises a nanotube based ReRAM.

10. The device of claim 1, wherein the one or more ReRAM elements are arranged in a matrix configuration.

11. The device of claim 1, wherein the one or more ReRAM elements are arranged in a crosspoint structure configuration.

12. The system of claim 1, wherein the one or more ReRAM elements are arranged in an n-dimensional array.

13. A method for generating random numbers, the method comprising:
    applying a programming signal to one or more resistive random access memory (ReRAM) elements;
    determining an impedance value of at least one of the one or more ReRAM elements; and
    generating a random number based on the determined impedance value of the at least one of the one or more ReRAM elements,
    wherein applying the programming signal comprises varying an amplitude of the programming signal or a pulse width of the programming signal, or a combination thereof, to alter a degree of randomness of impedance values of the one or more ReRAM elements.

14. The method of claim 13, wherein determining the impedance value of the at least one of the one or mor eReRAM elements comprises measuring at least one of a current signal, a voltage signal or a time delay at one or more output nodes, wherein each output node is coupled to at least one ReRAM element of the one or more ReRAM elements.

\* \* \* \* \*